July 24, 1962 T. ISHAM 3,045,980

HEATING AND COOLING APPARATUS

Filed Jan. 28, 1959 3 Sheets-Sheet 1

INVENTOR
Timothy Isham
By
R. S. Berry
ATTORNEY

July 24, 1962 T. ISHAM 3,045,980
HEATING AND COOLING APPARATUS
Filed Jan. 28, 1959 3 Sheets-Sheet 2
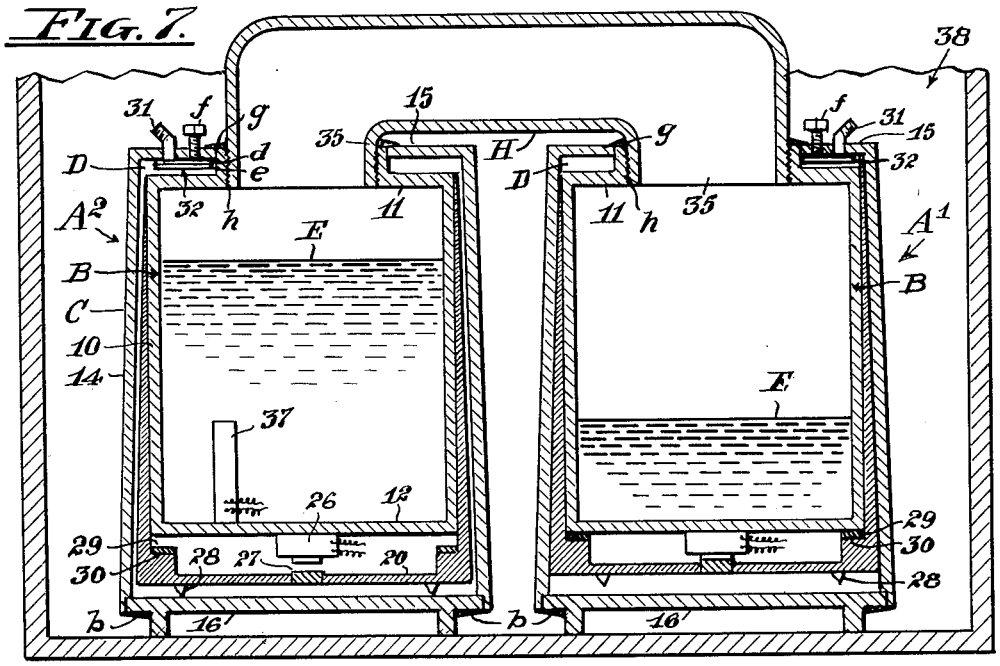
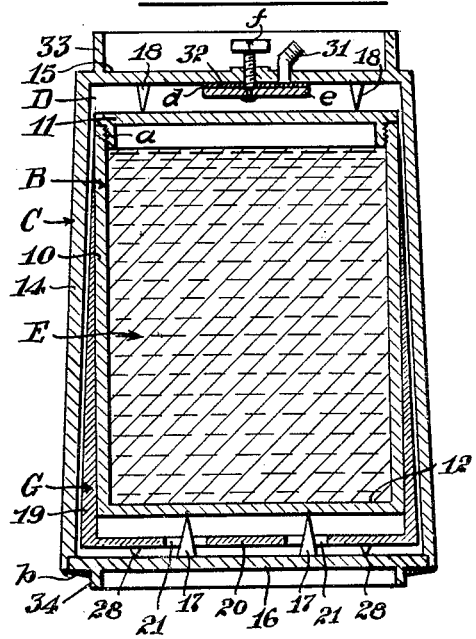
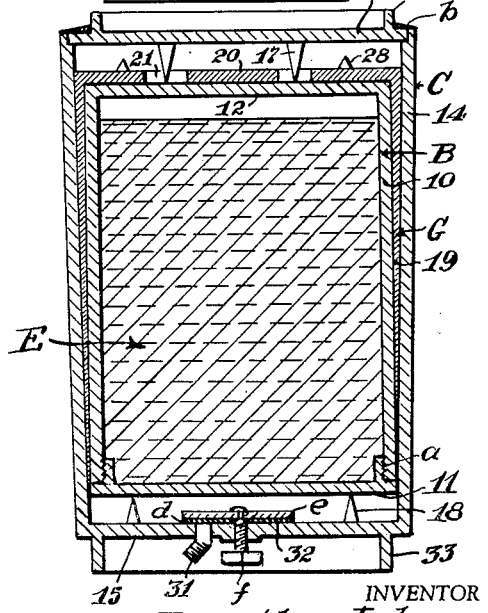
INVENTOR
Timothy Isham
BY R. S. Berry
ATTORNEY July 24, 1962  T. ISHAM  3,045,980
HEATING AND COOLING APPARATUS
Filed Jan. 28, 1959  3 Sheets-Sheet 3
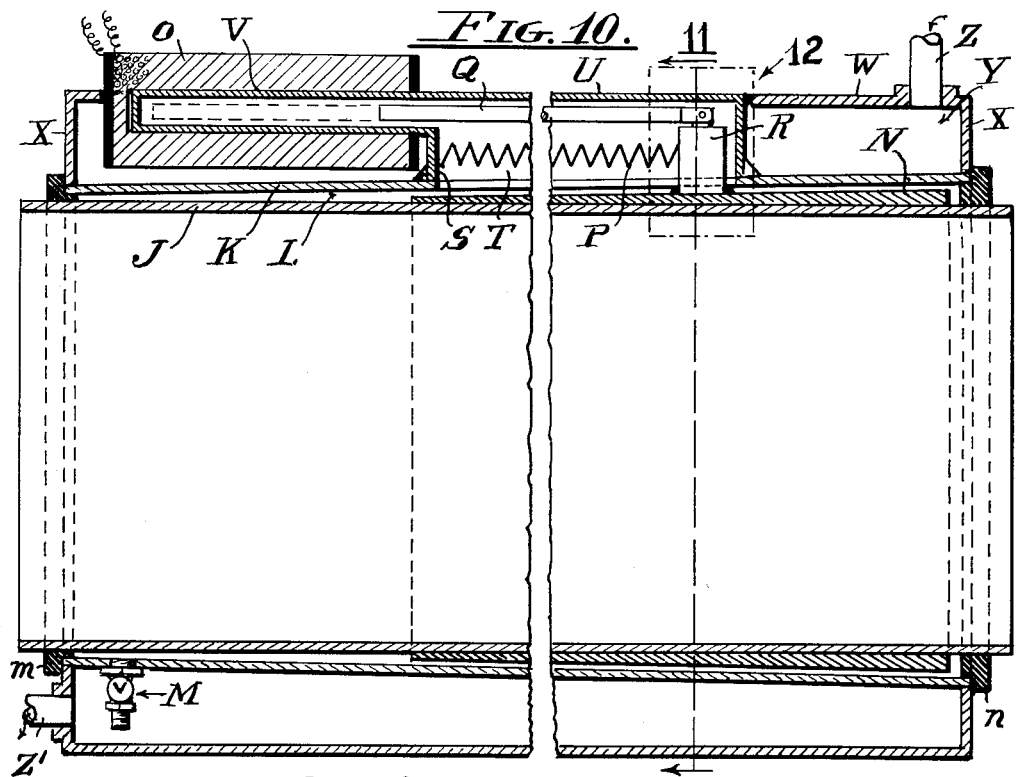
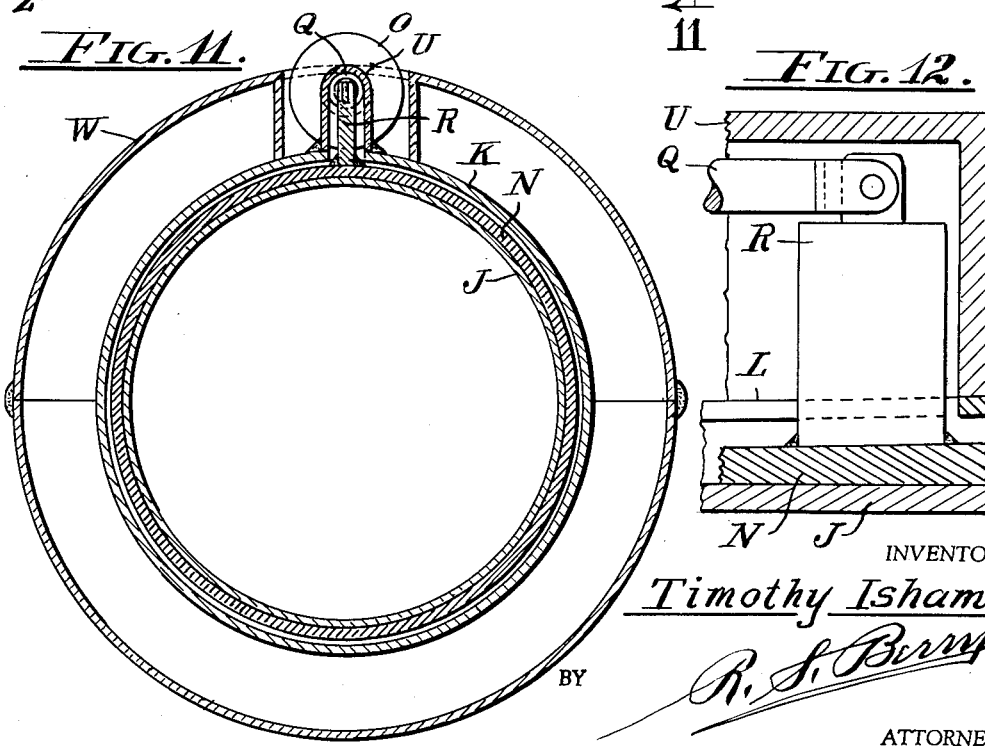
INVENTOR
Timothy Isham
BY
ATTORNEY

United States Patent Office 3,045,980
Patented July 24, 1962

3,045,980
HEATING AND COOLING APPARATUS
Timothy Isham, 6128 Wilshire Blvd., Los Angeles, Calif.
Filed Jan. 28, 1959, Ser. No. 789,604
1 Claim. (Cl. 257—191)

This invention relates to a heating or cooling apparatus and more particularly pertains to a device for controlling the flow of heat through heat conductive media.

The primary object of this invention is to provide a heat-valve embodying a gate operable to open and close a gap between a pair of spaced apart heat conductive bodies of different temperatures in a heating or cooling apparatus whereby conductive heat transfer between said bodies may be effected or terminated as occasion may require.

Another object is to provide a heating or cooling device embodying a heat conductive element for opening or closing a vacuum gap between adjacent heat conductive bodies to make and break heat exchange therebetween, wherein said element is adapted to be readily moved in and out of heat conductive relation to said bodies.

A further object is to provide a heating or cooling device embodying a heat-valve which device is applicable for use in various heating or cooling apparatus where control of the exchange of heat by conduction is a desideratum.

With the foregoing objects in view together with such other objects and advantages as may subsequently appear, the invention resides in the parts and in the combination, construction and arrangement of parts hereinafter described and claimed, and as illustrated by way of example in the accompanying drawing in which:

FIG. 7 is a diagram in section depicting a pair of the heat valve equipped heating and cooling devices as applied to a unit of the conventional absorption refrigeration system wherein the valve elements in the two devices are controlled by an electro-magnet;

FIG. 8 is a diagram in section of a heating or cooling device in which the valve element is gravity controlled and showing the valve element in its open position;

FIG. 9 is a view of the device of FIG. 8 showing it as inverted with the valve element in its closed position;

FIG. 10 is a view in longitudinal section depicting the invention as applied in effecting heat exchange of fluid in motion;

FIG. 11 is a view in cross section as seen on the line 11—11 of FIG. 10 in the direction indicated by the arrows; and FIG. 12 is an enlarged view of parts defined by the broken line parallelogram 12 in FIG. 10.

Figure 1:
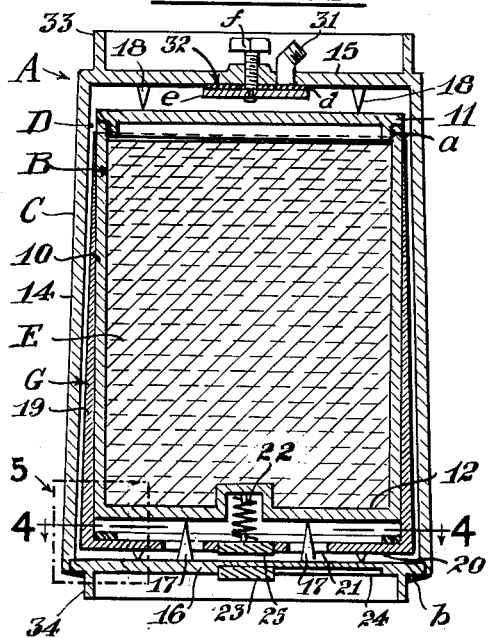
FIG. 1 is a view in vertical section partly in elevation of a heating and cooling device equipped with a heat-valve and depicting the valve element in its open position and as controlled by a permanent magnet.

Referring to the drawings more specifically, wherein corresponding parts are designated by like reference characters throughout the several views A—A¹ and A² indicate generally heating or cooling devices each embodying a fixed container B encompassed by a fixed tubular outer shell C. The container B comprises an elongated annular side wall 10 having a cylindrical surface and being of uniform external diameter throughout said side wall and terminating in end walls 11—12. The shell C comprises a frustro-conical or longitudinally inclined side wall 14 which overlies the cylindrical side wall 10 in spaced but proximate relation thereto throughout, which side wall 14 is fitted with end walls 15—16 overlying and spaced from the end walls 11—12 of the container B. The walls of the container B and of the shell C are formed of heat conductive material. The space D between the container B and the shell C is sealed and has atmosphere evacuated therefrom thereby creating a void within the outer shell C and surrounding the container B whereby the shell and container are substantially insulated from each other.

In FIGS. 1, 2, 8 and 9, the container B is supported and held within the shell C by pin-pointed spurs 17—18, a series of the spurs 17 projecting from the end wall 16 of the shell and having their pointed ends slightly indented in the end wall 12 of the container while a series of the spurs 18 project from the end wall 15 of the shell C and have their pointed ends indented in the end wall 11 of the container B.

Arranged within the container B is a heat absorbing and dispensing element E of any suitable character adapted to be charged with either heat or cold or to be acted upon thereby, the end wall 11 of the container B in the structure shown in FIGS. 1, 2, 8 and 9 being detachably connected to the side wall 10 as by threads $a$ to afford ingress to the interior of the container for replacement of the element E therein. In the device A as shown in FIGS. 1, 2, 8 and 9 the element E comprises a mass of calcium chloride jelly or similar material hermetically sealed in the container.

Where a pair of the devices A¹ and A² is employed in a refrigerating system as shown in FIG. 7, the element E in the container B of the device A¹ consists of liquid ammonia while the element E in the container B of the device A² comprises water for alternate absorption and liberation of ammonia. Manifestly any other means for developing heat or cold within the container B may be employed as occasion may require, since the invention is not directed to this feature per se.

Interposed between the side walls 10 and 14 of the container B and shell C is a longitudinally movable tubular heat conductive gate G for making and breaking connection between the walls 10 and 14 to thereby control the flow of heat molecules to and from the element E through the walls 10 and 14, the gate G being adapted when in one position to close the vacuum gap between the walls 10 and 14 to then afford a heat conductive connection therebetween and when in another position to open such gap and thereby break such connection.

The side wall 19 of the gate G conforms to and encompasses the major portion of the cylindrical wall 10 of the container B in constant superficial sliding contact therewith; the walls 19 and 10 being substantially coextensive and contacting throughout their contiguous surfaces. The outer periphery of the wall 19 is tapered or inclined longitudinally and extends parallel with the inner periphery of the inclined wall 14 of the shell C and is designed to be positioned either in superficial contact with or in spaced relation thereto as particularly shown in FIGS. 6 and 5 respectively. The wall 19 of the gate G has one end thereof integrally connected with the margin of a disk 20 disposed between the end walls 12 and 16 of the container B and shell C, the disk 20 having apertures 21 through which the spurs 17 extend in spaced relation to the aperture margins.

In order to enable positioning of the gate G within the shell C the end wall 16 on the enlarged end of the shell is initially separate from the side wall 14 and after mounting the gate G on the container B and positioned the assembly in the shell C the end wall 16 is sealed along its margin on the side wall 14 as by a weld or soldered joint b.

Figure 2:
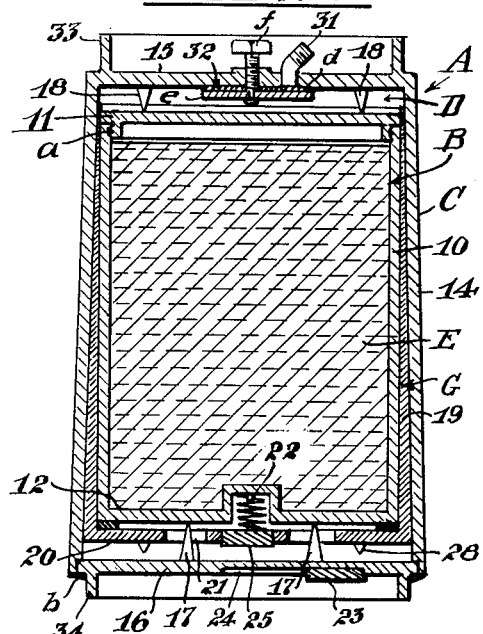
FIG. 2 is a view similar to FIG. 1 showing the valve element in its closed position.
Figure 3:
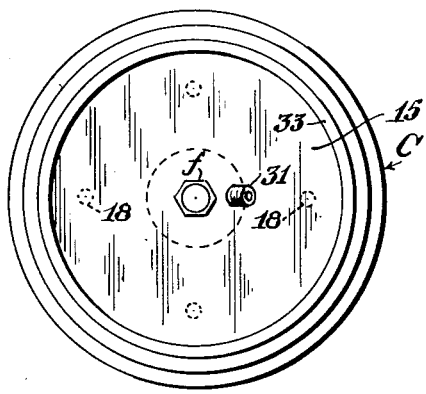
FIG. 3 is a plan view of the device shown in FIG. 1.
Figure 4:
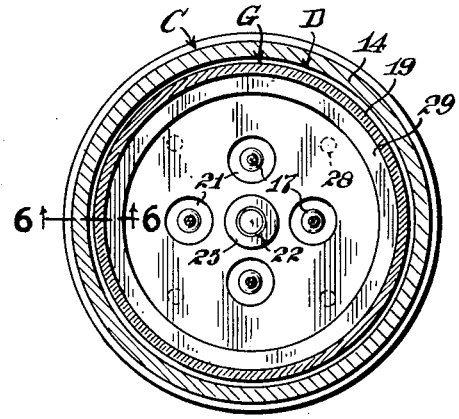
FIG. 4 is a horizontal section and plan view as seen on the line 4—4 of FIG. 1.

In the device shown in FIGS. 1 and 2, the gate G is normally held in its closed position shown in FIG. 2 by means of a coiled pull spring 22 one end of which is attached to the disk 20 and the other end of which is connected to the end wall 12. In this instance movement of the gate G to its open position in opposition to the spring 22 is effected by means of a permanent magnet 23 slidably mounted in a guideway 24 on the outer side of the end wall 16 and movable to a position in or out of operative relation to an armature 25 fixed on the disk 20, the magnet 23 being disposed to one side of the armature to permit closing of the gate under the action of the spring 22 as shown in FIG. 2, and being positioned opposite the armature to effect a pull thereon such as to move the gate to its open position and retain it in such position as shown in FIG. 1.

Where the devices $A^1$ and $A^2$ are employed in a refrigerating system as shown in FIG. 7, the gate G is controlled by an electromagnet 26 here depicted as mounted on the underside of the bottom wall of the container B with the pole thereof presented to an armature 27 on the disk 20 of the gate G which latter is disposed in an upright position so as to normally gravitate to its open position as shown in the device $A^2$ at the left side of FIG. 7. Energizing of magnet 26 attracts the armature 27 and thereby elevates the gate G to its closed position as shown in the device $A^1$ at the right side of FIG. 7.

Where the device A is employed as a portable unit, the gate G may be gravity operated, it then being disposed in its open position by gravity when the device is positioned upright as shown in FIG. 8, and gravitating to its closed position on inverting the device as shown in FIG. 9.

As a means for maintaining the disk 20 out of contact with the end wall 16 of the shell C when the gate G is in its open position, a series of pin-pointed studs 28 is provided on the outer side of the disk 20 and arranged with their pointed ends presented to the adjacent face of the end wall 16 and disposed to abut the latter when the gate valve is in its open position.

In some instances it may be desirable to provide a cushioned stop for the gate G when advancing to its closed position. For this purpose a resilient abutment 29 is interposed between the end wall 12 and the disk 20, being here shown in FIGS. 1, 2, 5 and 6 as seated on the inner face of the disk 20, and in FIG. 7 as seated on a shoulder 30 projecting from the inner face of the gate.

While evacuation of atmosphere from the interior of the shell C may be effected in any conventional fashion, the shell C is here shown as equipped with a threaded nipple 31 for detachable connection with a coupling (not shown) leading to a suitable vacuum pump, the nipple being closed against ingress of air after the evacuation of atmosphere from the shell, by means of a sealing element 32 arranged to bear against the underside of the end wall 15 in overlying relation to the inner end of the nipple 31, the element 32 being here shown as comprising a pad d on a disk e carried on a screw f threaded through the end wall 15 and operable to clamp the pad d in sealing relation to the nipple 31.

The end walls 15—16 of the shell C of the device A shown in FIGS. 1, 2, 8 and 9 have flanges 33—34 projecting from their outer faces which serve as supporting standards on which the structure may be seated on a surface either end up.

Figure 5:
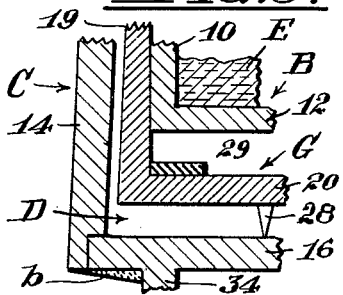
FIG. 5 is an enlarged detail in section of the portion of the device defined by the broken line parallelogram indicated at 5 in FIG. 1, showing the valve element in its open position.
Figure 6:
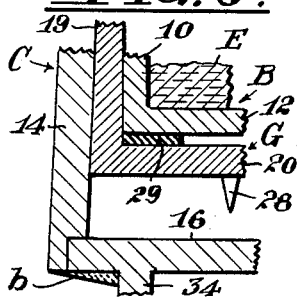
FIG. 6 is a view similar to FIG. 5 showing the valve element in its closed position.

In the operation of the invention, when it is desired to conduct heat or cold through the side walls of the container B and shell either to or from the element E within the container B, the gate G is disposed in its closed position as shown in FIG. 6, and when it is desired to terminate such conduction, the gate G is disposed in its open position as shown in FIG. 5. This movement of the gate G is preferably effected magnetically but may be accomplished by the action of gravity or in any other suitable manner whereby the inclined face of the gate G may be moved longitudinally in and out of contact with the inner face of the inclined side wall 14 of the shell C. This movement of the gate G may be very slight since the inclined outer face of the gate may be disposed in close proximity to the wall when in its open position, that is with the surfaces of the gate and shell side wall almost touching, since the space between the open gate and shell being a void the flow of heat thereacross is nil. For the purpose of clarity the gap between the gate and shell side wall is exaggerated in the drawings.

In the application of the invention to an absorption refrigeration system as shown in FIG. 7 wherein a pair of the devices $A^1$ and $A^2$ is employed, the containers B in such devices constitute liquid refrigerant containing tanks which are inter-connected at their upper ends by an open tube H in the usual manner. As here shown the ends 35—35 of the tube H lead through the top walls 15 of the shells C and are sealed in engagement therewith as by welds or soldering g and extend and open through the top walls 11 of the containers B and are engaged therewith by a threaded connection h. The water container B in the device $A^2$ is equipped with an electric heater 37 for intermittently heating the ammonia charged water.

The refrigerating system shown in FIG. 7 constitutes simplest form of system employing the absorption refrigeration principle, and is set forth for the purpose of illustrating the manner in which the present invention may be applied thereto. In this system ammonia vapors evaporating from the liquid ammonia in the device $A^1$ are directed by the tube H into the container B of the device $A^2$ and are absorbed by the water therein. The evaporation of the ammonia produces refrigeration in the device $A^1$ so as to effect a cooling action on a substance contained in an enclosure 38 in which the refrigeration unit is arranged. By equipping the device $A^1$ with the gate G this cooling action will occur only when the gate G is in its closed position as shown in FIGS. 6 and 7 and will be terminated on moving the gate G into its open position as shown in FIG. 5.

When the water in the device $A^2$ has become saturated with ammonia, the heater 37 is placed in operation thereby causing evaporation of the ammonia in the device $A^2$. The resultant ammonia vapors pass through the tube H back to the container in the device $A^2$ and are condensed therein by the cooling effect of the content of the enclosure 38 which may be either liquid or gaseous, the gate G in device $A^1$ being then closed. During this operation the gate G in the device $A^2$ is maintained open so that the heat generated in the container B therein will not be transmitted to the shell C of the device $A^2$. On termination of the latter ammonia evaporating period, operation of the heater 37 is discontinued, and if desired the then open gate G in the device $A^2$ is closed to permit heat to pass from the container of the device $A^2$ into the refrigerating medium of the enclosure 38. A cycle of operation is completed when the ammonia is transferred back to the device $A^1$.

In order to obtain continuous refrigerating action with a system of the above character a plurality of pairs of the associated devices $A^1$ and $A^2$ are assembled in the enclosure 38, and operated alternately in relation to each other.

From the foregoing it will be seen that by the provision of the described heat gate G the refrigerating action may be readily controlled, that is started and stopped at will, by closing and opening the gate.

In the application of the invention shown in FIGS. 10–12, J indicates a tube for conveying fluids and constituting a fluid container, which tube is designed to be connected in a line of conduit through which a flow of a fluid is directed to or from which temperature exchange is to be effected. Surrounding the tube J in sealed spaced relation thereto is a tapered tubular shell K affording a vacuum space L between the tube and shell on evacuating air from the space L by a suitable pump through a normally closed valve M in a usual manner.

Encompassing the tube J within the space L and in superficial sliding contact with the tube J is a cylindrical sleeve N constituting a heat valve or gate and having a tapered outer periphery paralleling and contiguous to the tapered inner periphery of the shell K, which sleeve is adapted to be moved longitudinally to dispose its outer surface in and out of contact with the inner surface of the shell K. The sleeve N is advanced by means of an electromagnet O and is retracted by a spring P; the magnet acting on an armature Q connected at its outer end to a bracket R fixed on the valve sleeve N and the spring P bearing between the bracket R and a fixed wall S adjacent the inner end of the magnet O. The bracket R, spring P and armature Q are housed in a vacuum chamber T within a housing U, which chamber opens to the vacuum space L through an aperture in the shell K, and which housing embodies a tubular extension V which extends into and is encompassed by the magnet O, the interior of the extension V being open to the chamber T and affording vacuum space in which the armature Q extends when in its advanced position as indicated in dotted lines in FIG. 10. The wall S constitutes an end wall of the housing U.

Encompassing the shell K in spaced relation thereto is a cylindrical wall W having end walls X—X attached to the ends of the shell K, which walls enclose a space Y surrounding the shell K designed to be occupied by a fluid medium delivered thereto through an intake Z and discharged therefrom through an outlet Z'; which medium may constitute a gas or a liquid to or from which heat or cold is to be exchanged with the temperature of the fluid passing through the tube J as controlled by the sleeve N.

The tube J, sleeve N and shell K are formed of any suitable temperature conductive material such that when the sleeve N is positioned in contact with both the tube J and shell K temperature exchange will be effected through the encompassing walls of said tube, sleeve and shell.

As a means for preventing or at least minimizing conduction of heat through the end walls m and n of the vacuum space L such end walls comprise sealing rings formed of a suitable material of low heat conductivity.

Obviously on energizing the magnet O the armature will be attracted and advanced so as to advance the sleeve N in opposition to the spring P and effect contact of the sleeve N with the shell K and on de-energizing the magnet O the spring P will retract the sleeve to break contact with the shell K. The sleeve N as before stated constitutes a gate which when closed in contact with both the tube J and shell K will act as a conductor to effect heat exchange between the tube and shell in either direction according to the difference in temperature of the fluids contained in the tube J and space Y, the higher temperature taking the place of lower temperature pursuant to the well known principles of heat exchange.

An important feature of the invention resides in the arrangement of the fixed inner and outer heat conductive walls 10 and 14 in insulated spaced but proximate relation to each other with the longitudinally movable gate in constant superficial contact throughout with the inner wall, and with the outer wall and the gate having their contiguous inclined surfaces in parallel proximate but insulated relation to each other, whereby but slight readily actuated longitudinal reciprocal movement of the gate will make or break conductive contact between the gate and the outer wall, thus greatly facilitating control of heat exchange between the container B and its encompassing shell C.

While a specific embodiment of the invention has been shown and described, the invention is not limited to the exact details of construction set forth, and the invention embraces such changes, modifications and equivalents of the parts and their formation and arrangement as come within the purview of the appended claim.

The invention herein set forth is related to the subject matter of allowed application Ser. No. 703,344 filed by me December 17, 1957, on Temperature Exchanger, now Patent No. 2,902,266, and also to that of Patent No. 3,006,611 issued to me for Heat Exchange Apparatus on October 31, 1961.

I claim:

In a heat and cold transferring apparatus embodying a pair of fixed elongated inner and outer annular heat conductive walls arranged in concentric spaced but proximate relation to each other with a sealed vacuum spaced therebetween and a temperature source located within and encompassed by the inner of said walls; the inner of said walls having a cylindrical outer surface of uniform external diameter throughout, and the outer of said walls having its interior surface longitudinally inclined relative to said cylindrical surface, a tubular heat conductive gate interposed between said walls in longitudinal slidable relation thereto having opposed inner and outer sides the inner side of which is in constant superficial slidable contact throughout with the outer surface of said inner wall and the outer side of which is inclined in parallel relation to the inclined inner surface of said outer wall whereby on longitudinal reciprocation of said gate its inclined outer side may be disposed in or out of superficial contact with the inclined inner surface of said outer wall.

References Cited in the file of this patent

UNITED STATES PATENTS

| | | |
|---|---|---|
| 2,002,309 | Carpenter | May 21, 1935 |
| 2,003,496 | Roe | June 4, 1935 |
| 2,068,550 | Knight | Jan. 19, 1937 |
| 2,367,451 | West | Jan. 16, 1945 |
| 2,902,266 | Isham | Sept. 1, 1959 |
| 2,907,185 | Isham | Oct. 6, 1959 |